United States Patent [19]

Holmström et al.

[11] Patent Number: 5,260,535
[45] Date of Patent: Nov. 9, 1993

[54] APPARATUS FOR INDUCTION WELDING

[75] Inventors: Gert Holmström, Lund; Lazlo Pozna, deceased, late of Malmö, all of Sweden, by M. Ekberg Sparbanken Skåne, executor

[73] Assignee: Tetra Alfa Holdings S.A., Pully, Switzerland

[21] Appl. No.: 770,326

[22] Filed: Oct. 3, 1991

[30] Foreign Application Priority Data

Oct. 11, 1990 [SE] Sweden .................. 9003243

[51] Int. Cl.⁵ .................................. H05B 6/40
[52] U.S. Cl. .................. 219/10.53; 219/10.73; 219/10.79; 156/274.2; 156/380.2
[58] Field of Search ............... 219/10.53, 10.79, 10.75, 219/10.57, 10.73; 156/272.4, 273.9, 274.2, 379.7, 380.2

[56] References Cited

U.S. PATENT DOCUMENTS

| | | | |
|---|---|---|---|
| 2,873,344 | 2/1959 | Kocks et al. | 219/10.79 |
| 3,446,930 | 5/1969 | Seulen et al. | 219/10.79 |
| 3,632,943 | 1/1972 | Engler et al. | 219/10.79 |
| 3,864,186 | 2/1975 | Balla | 219/10.53 |
| 4,363,946 | 12/1982 | Busemann | 219/10.79 |
| 4,704,509 | 11/1987 | Hilmersson et al. | 219/10.53 |
| 5,001,319 | 3/1991 | Holmström | 219/10.53 |

FOREIGN PATENT DOCUMENTS 2835552 2/1980 Fed. Rep. of Germany .
346251 7/1972 Sweden .

Primary Examiner—Philip H. Leung
Attorney, Agent, or Firm—Burns, Doane, Swecker & Mathis

[57] ABSTRACT

An apparatus for induction sealing plastic-coated thermoplastic packaging material that includes a metal layer, comprises an inductor and a counter block between which the packaging material is to be positioned. The inductor includes a carrier portion that is provided with first and second conductors. The first and second conductors are exposed on a first side of the carrier portion and the second conductor is exposed on a second side of the carrier portion such that the width of the exposed portion of the second conductor on the second side of the carrier portion is greater than the width of the exposed portion of the first conductor on the first side of the carrier portion.

13 Claims, 1 Drawing Sheet

U.S. Patent
Nov. 9, 1993
5,260,535
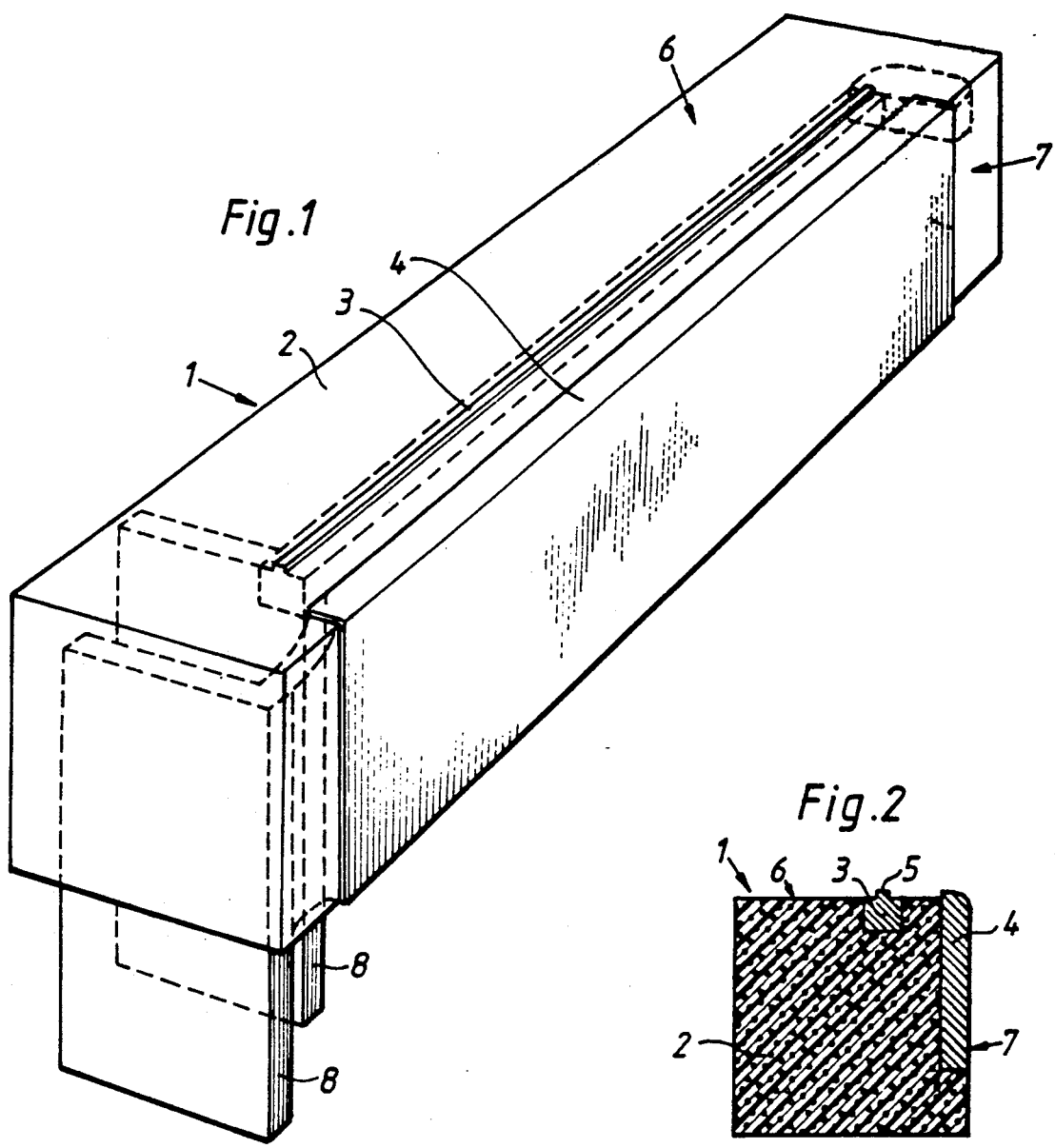
Fig.1
Fig.2
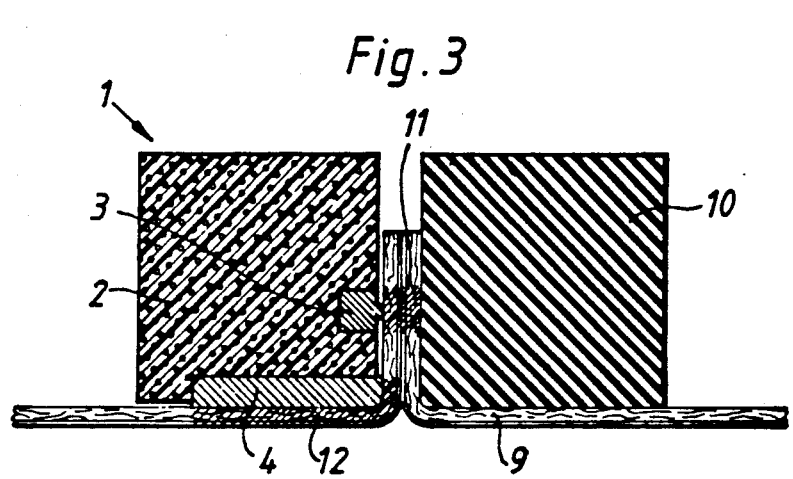
Fig.3

APPARATUS FOR INDUCTION WELDING

FIELD OF THE INVENTION

The present invention relates to a sealing apparatus and more particularly, to an apparatus for sealing thermoplastic-coated packaging material having at least two layers of metal foil, preferably aluminium foil.

BACKGROUND OF THE INVENTION

It has long been known in the packaging industry to employ packaging materials comprising outer layers of thermoplastic, these outer layers being capable of being sealed to one another by fusion after heating and compression for the formation of tight and durable sealing joints or seams. One form of package production employs so-called blanks which are filled and sealed at the top, or alternatively the bottom, and then finally formed. These prefabricated blanks are cut to exact dimensions in order to obtain packages as cheap as possible, with the result that that region which is to be sealed after the filling operation consists of a very narrow area. When the two edges which are to be sealed to one another are compressed together, it may happen that they are not entirely in register with one another, which even further reduces that area on which the sealing is to be effected. Possibly, the sealing edge may also include parts which may not under any circumstances be overstepped, such as, for example crease lines or the like.

Normally, the sealing of filled blanks is carried out using hot air. This requires a large number of mechanical parts which, when the intention is to produce aseptic packages, constitutes a disadvantage simply because there are more parts which must be kept aseptic.

Aseptic packages are commonly made from a packaging material which contains a thin metal foil, preferably aluminium foil. When the packaging material contains a metal foil, it is possible to employ induction welding, which is also a known technique within the packaging industry.

The technique for induction welding is based on the fact that the magnetic field surrounding a conductor impressed with an alternating current is capable of inducing a current in an adjacent electrically conductive material, which, depending upon the resistance of the material, entails a more or less manifest heating of the material. Hence, in induction welding an induction coil is applied of the same configuration as the desired finished weld adjacent the laminate containing aluminium foil, whereafter the laminate is compressed with the material with which it is to be united. The aluminium foil will now be heated in a pattern corresponding to the configuration of the coil and, by suitable selection of the current force, frequency and processing time, the material can be heated to the desired temperature, i.e. a temperature which is sufficiently elevated for adjacent layers of the thermoplastic material to be heated to a fusion, or sealing temperature, whereupon thermoplastic layers brought together under pressure are caused to fuse together for obtaining a tight and durable seal or seam.

However, existing inductors are most often designed for welding on a continuous web in which the transverse seams are made two-by-two with an intermediate spacing where the web is then separated. In order to be able to use existing inductors on a pre-cut blank, with the restricted space available for the sealing joint or seam, it is possible to make inductors with narrower poles, but this generally entails problems in cooling the inductor and, moreover, such inductors are also more difficult to manufacture. The space between the two conductors in the inductor may also be made narrower, but then a greater current power will be required to obtain a reliable sealing seam, and this in its turn implies greater losses in the inductor.

OBJECT OF THE INVENTION

One object of the present invention is to design an inductor which seals on a very narrow surface without giving rise to large current losses or problems in cooling the inductor.

SUMMARY OF THE INVENTION

This and other objects have been attained according to the present invention in that the apparatus includes a movable inductor that is connectable to a power source, a movable counter block, and an electrically insulating carrier portion. The inductor includes at least two conductors which are substantially parallel to one another in a first plane and are slightly spaced apart. At a sealing least one of the two conductors is of considerably larger extent than the other conductor in a second plane at right angles to the first plane.

BRIEF DESCRIPTION OF THE ACCOMPANYING DRAWINGS

One preferred embodiment of the present invention will now be described in greater detail hereinbelow, with particular reference to the accompanying Drawings, in which:

FIG. 1 is a top perspective view of the inductor portion of the apparatus;

FIG. 2 is a cross-sectional side view through the inductor portion of the apparatus; and FIG. 3 is a cross-sectional side view displaying how the sealing is carried out on the edge of a pre-cut blank.

DESCRIPTION OF PREFERRED EMBODIMENT

Referring to the Drawings, FIG. 1 shows the inductor portion of the apparatus, this portion consisting of a substantially parallelepipedic carrier portion 2 manufactured from an electrically insulating substance, preferably a cast compound with ferrite.

In, and partly on the surface of the carrier portion, there are two conductors 3 and 4 which are electrically interconnected. The one conductor 3 consists of a tube or rod of copper. The other conductor 4 consists of a copper plate. The first-mentioned conductor 3 may advantageously be designed with a ridge 5 upstanding from the carrier portion surface. This upstanding ridge 5 is, during the sealing operation, compressed with harder greater pressure against the packaging material 9 and contributes in the realisation of better sealing seams or joints.

In one plane of the carrier portion 2, designated the first plane 6, the two conductors 3, 4 are seen on the surface as two parts of approximately equal width, with a space between them. In a second plane 7 at right angles to the first plane 6, the one conductor 4 is seen as a considerably wider copper surface. Its width is at least twice that of the width of the conductor 3. In one preferred embodiment, the conductor 3 is roughly three times wider than the width of the conductor 3. The heating ratio is the square of the width and, in the preferred embodiment, there will thus be obtained a ninefold higher heating under the narrower conductor 4, at the same time as the size of the inductor 1 can be kept within acceptable limits.

In the one end of the carrier portion, the conductors 3 and 4 extend to connection members 8 for a high frequency current source (not shown) from which a constant power output can be obtained which can be regulated for an optimum welding process. In the other end of the carrier portion 2, the conductors 3 and 4 are electrically interconnected so that they constitute one turn in a coil.

A sealing apparatus or inductor 1 of the type illustrated in FIG. 1 is intended to be mounted in a machine part which is caused to execute the desired sealing movement and apply the desired sealing pressure. In other words, this sealing portion (which is often called a sealing jaw) is moved in a relative movement towards a so-called counter jaw 10 which, in most cases, is also movable. The counter jaw 10 is wholly or partly manufactured from hard rubber in order to be able to serve as a pressure equalizer. The open end of the filled package container blank is formed so that the packaging material 9 is brought together over as great a width as possible. The above-mentioned sealing jaws 1 and 10 are closed towards one another as shown in FIG. 3, and both of the sealing jaws 1 and 10 surround that part of the packaging material 9 which is to be sealed. In such instance, the packaging material 9 abuts against both of the planes 6 and 7 where the conductors 3 and 4 are visible on the surface of the carrier portion 2 of the inductor 1.

The sealing jaws 1 and 10 exercise a pressure on the compressed packaging material layers 9 at the same time as heat is generated in the sealing region with the aid of the inductor 1.

When a high frequency current passes through that coil constituted by both of the conductors 3 and 4 of the inductor 1, a current is induced in the metal foil layer in the packaging material 9, with the result that the metal foil layer is rapidly heated and gives off heat to the adjacent thermoplastic layer which is caused to melt and fuse with adjacent inner thermoplastic layers of the adjacent packaging material layer. This heating is realised rapidly and efficiently and it may in principle be assumed that the metal foil layer constitutes a short-circuited winding in a transformer, in which the inductor coil constitutes the primary winding.

If the inductor 1 is placed adjacent the aluminium foil layer in which a current is to be induced, the current flow path in the aluminium layer will be most distinctly central in the conductor 3 and the heat generation will be limited to a narrow region 11 which substantially corresponds to the width of the induction conductor 3. Facing the wide portion of the conductor 4 in the second plane 7, the induced current is distributed over a region 12 which is at least three times wider than the region 11 located centrally of the conductor 3. Since the current is distributed over a greater surface area in the conductor 4, the region 12 will not be heated to the melting point of the thermoplastic and the packaging material 9 which abuts against the wide portion of the conductor 4 will remain unaffected at the moment of fusion and sealing. If the conductor 4 is placed as in the preferred embodiment, there will be obtained a concentrated and efficient seal of the packaging material 9. In any other placing, in which the conductor 4 is disposed further away from the packaging material 9, there is the risk of a deterioration in the sealing effect, in particular towards the ends of the inductor 1.

Thus, employing the present invention, it is possible to realise a sealing or fusion caused by induction heating of a very limited width in which the margins are small and in which it is not permitted to overstep beyond that region which is available for the seal proper. At the same time, the inductor is employed in an efficient manner and a tight and durable sealing seam or joint will be obtained.

What is claimed is:

1. An apparatus for sealing thermoplastic-coated packaging material that includes at least one layer of metal foil, said apparatus comprising a movable inductor and a movable counter block, said inductor including at least two conductors, at least one of said conductors being connectable to a high frequency current source, said at least two conductors being positioned in an electrically insulating carrier portion and having first surfaces disposed parallel to one another in a first plane in a spaced apart relationship from one another, at least one of the two conductors having a second surface whose width in a second plane is greater than the width of the first surface of the other conductor, said second plane being disposed at a right angle to said first plane.

2. The apparatus as claimed in claim 1, wherein the second surface of said other conductor is of a width in said second plane that is at least twice as wide as the width of said at least one conductor in said first plane.

3. The apparatus as claimed in claim 1, wherein said at least two conductors are of the same width in said first plane.

4. The apparatus as claimed in claim 1, wherein the sealing is carried out between the first plane and the counter block.

5. The apparatus as claimed in claim 1, wherein said two conductors are electrically interconnected to one another.

6. An apparatus for sealing plastic-coated packaging material that includes at least one layer of metal material, comprising an inductor and a counter block, said inductor comprising a carrier portion and at least two conductors disposed on the carrier portion, at least one of said conductors being adapted to be connected to a high frequency current source, said carrier portion having a first side and a second side, said second side being positioned transverse to the first side so that a plane containing the first side intersects a plane containing the second side, said first and second conductors being exposed on said first side of the carrier portion in spaced apart relation to one another and said second conductor being exposed on said second side of said carrier portion, the width of said second conductor as exposed to the second side of the carrier portion being greater than the width of the first conductor as exposed to the first side of the carrier portion.

7. The apparatus according to claim 6, wherein the width of said second conductor as exposed to the second side of the carrier portion is at least about two times as large as the width of the first conductor as exposed to the first side of the carrier portion.

8. The apparatus according to claim 7, wherein the width of said first and second conductors as exposed at the first side of the carrier portion is substantially equal.

9. The apparatus according to claim 6, wherein the first conductor includes a ridge that extends above a plane in which the first side of the carrier portion and the exposed side of the first conductor lie.

10. The apparatus according to claim 6, wherein said first and second conductors are substantially parallel to one another.

11. The apparatus according to claim 6, wherein the width of said second conductor as exposed to the second side of the carrier portion is three times larger than the width of the first conductor as exposed at the first side of the carrier portion.

12. The apparatus according to claim 6, wherein said carrier portion is made of an electrically insulating material.

13. The apparatus according to claim 6, wherein said two conductors are electrically interconnected to one another.

* * * * *